Patented Jan. 4, 1944

2,338,492

UNITED STATES PATENT OFFICE 2,338,492

COMPOSITION CONTAINING TRIAZINYL CARBOXY-ALKYL SULPHIDES

Gaetano F. D'Alelio and James W. Underwood, Pittsfield, Mass., assignors to General Electric Company, a corporation of New York No Drawing. Application February 19, 1942, Serial No. 431,540

20 Claims. (Cl. 260—42)

This invention relates to the production of new materials and more particularly is concerned with synthetic compositions of particular utility in the plastics and coating arts and which contain, or are produced from, triazinyl carboxy-alkyl sulphides.

This application is a continuation-in-part of our copending application Serial No. 421,682, filed December 4, 1941, now Patent No. 2,312,699, issued March 2, 1943, and assigned to the same assignee as the present invention.

The triazinyl carboxy-alkyl sulphides used in carrying the present invention into effect may be represented by the following general formula:

I 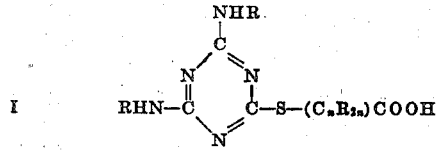

In the above formula $n$ represents an integer and is at least 1 and not more than 2, and R represents a member of the class consisting of hydrogen and monovalent hydrocarbon and substituted hydrocarbon radicals, more particularly halo-hydrocarbon radicals. From a consideration of this formula it will be seen that, since $n$ represents an integer which is 1 or 2, the linkage of the carboxy-alkyl grouping to the sulphur atom in all cases will be alpha or beta to the carboxy grouping. It also will be observed that linkage of the triazinyl grouping to the sulphur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, methallyl, tertiary-butyl, crotyl, ethallyl, heptyl, isoheptyl, octyl, decyl, isoamyl, hexyl, etc.), including cyclo-aliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl, chlorophenyl, phenyl, chloroethyl, bromoethyl, bromopropyl, bromotolyl, iodophenyl, etc. Preferably R in Formula I is hydrogen. However, there also may be used in carrying the present invention into effect chemical compounds such, for instance, as those represented by the general formulas:

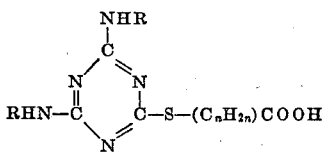

and, more particularly,

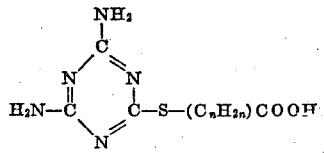

where $n$ and R have the same meanings as above given with reference to formula I.

Instead of the symmetrical triazines (s-triazines) represented by the above formulas, corresponding derivatives of the asymmetrical and vicinal triazines may be used.

The triazinyl carboxy-alkyl sulphides used in carrying the present invention into effect are more fully described and are specifically claimed in our above-mentioned copending application Serial No. 421,682.

Specific examples of triazinyl carboxy-alkyl sulphides that may be employed in producing the compositions of this invention are listed below:

Diamino s-triazinyl carboxy-methyl sulphide
4,6-di-(methylamino) s-triazinyl-2 carboxy-methyl sulphide
Diamino s-triazinyl alpha-(carboxy-ethyl) sulphide
Diamino s-triazinyl beta-(carboxy-ethyl) sulphide
4-amino 6-methylamino s-triazinyl-2 carboxy-methyl sulphide
4,6-di-(ethylamino) s-triazinyl-2 carboxy-methyl sulphide
4,6-di-(anilino) s-triazinyl-2 carboxy-methyl sulphide
4,6-di-(chloroanilino) s-triazinyl-2 carboxy-methyl sulphide
4,6-di-(cyclohexylamino) s-triazinyl-2 carboxy-methyl sulphide 4,6-diamino s-triazinyl-2 alpha-(carboxy-propyl) sulphide
4,6-diamino s-triazinyl-2 beta-(carboxy-butyl) sulphide
4,6-diamino s-triazinyl- 2 alpha-(carboxy-pentyl) sulphide
4,6-diamino s-triazinyl-2 beta-(carboxy-hexyl) sulphide
4-methylamino 6-toluido s-triazinyl-2 beta-(carboxy-ethyl) sulphide
4-benzylamino 6-phenethylamino s-triazinyl-2 alpha-(alpha-phenyl beta-tolyl carboxy-ethyl) sulphide
4-cyclopentylamino 6 - xylidino s - triazinyl - 2 beta-(alpha, alpha-dibutyl beta-benzyl carboxy-propyl) sulphide
4,6-diamino s-triazinyl-2 carboxy-(bromophenyl)-methyl sulphide
4,6-diamino s-triazinyl-2 beta-(alpha-chlorophenyl carboxy-butyl) sulphide Additional examples of triazinyl carboxy-alkyl sulphides that may be used in practicing the present invention are given in our above-identified copending application Serial No. 421,682.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and certain triazinyl carboxy-alkyl sulphides, numerous examples of which have been given above and in the aforementioned copending application. These new reaction products are not only valuable in themselves, but find particular utility when incorporated into an acid-curing thermosetting resin, for example acid-curing, thermosetting phenoplasts and aminoplasts. For instance, we may add a soluble, fusible aldehyde-reaction product of the triazinyl carboxy-alkyl sulphide to an acid-curing thermosetting resin and heat the resulting mixture. The aldehyde-sulphide reaction product accelerates the conversion of the acid-curing thermosetting resin to an insoluble, infusible state. Or, we may cause the triazinyl carboxyalkyl sulphide itself to react with the acid-curing thermosetting resin and thus accelerate the curing of the resin. Or, we may form a rapidly curing resin by effecting reaction between ingredients comprising a triazinyl carboxy-alkyl sulphide of the kind above mentioned, an aldehyde, including polymeric aldehydes, hydroxyaldehydes and aldehyde-addition products, and a phenol (including phenol itself, cresols, xylenols, etc.), or an amino or amido compound (including imino and imido compounds), e. g., aminotriazoles, aminodiazines, urea, thiourea, dicyandiamide, melamine, etc.

The resin syrups and molding compositions of this invention may be stored for long periods of time without material alteration. In marked contrast the prior acid-curing thermosetting resins, more particularly those containing direct or active curing catalysts, such as acids, e. g., hydrochloric, ethyl sulphuric, phthalic, chloroacetic, phosphoric. etc., lacked time or storage stability. This necessitated early use of the material after incorporating the catalyst.

Further, the molding compositions of this invention cure rapidly under heat or heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions at normal or at elevated temperatures. Any substance or catalyst which has an alkaline or an acid nature may be used to obtain the acid, alkaline or neutral condition, as for example, ammonia, sodium hydroxide, calcium hydroxide, methyl amine, diethyl amine, tributyl amine, ethanol amines, tri-isopropanol amine, etc.; mixtures of such alkaline substances; inorganic or organic acids such as hydrochloric, sulphuric, phosphoric, acetic, acrylic, crotonic, malonic, etc.; mixtures of such acids; acid salts such as sodium acid sulphate, monosodium phosphate, monosodium phthalate, etc.; basic salts such as ammonium carbonate, potassium carbonate, sodium acetate, etc.; or mixtures of such salts.

We may condense the components used in practicing this invention under various conditions. For example, all the components may be mixed together and the reaction caused to proceed under acid, alkaline or neutral conditions. Or, we may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, etc., and an aldehyde, etc.), add the triazinyl carboxy-alkyl sulphide thereto and effect further condensation. Or, we may first partially condense the diamino triazinyl carboxy-alkyl sulphide with an aldehyde under acid, alkaline or neutral conditions and then add thereto at least one other aldehyde-reactable organic compound, e. g., a phenol, a urea, aniline, etc., and effect further condensation. Also, we may separately partially condense a diamino triazinyl carboxy-alkyl sulphide and a different aldehyde-reactable organic compound with an aldehyde and then mix the two products of partial condensation and effect further condensation therebetween. The components of each reaction product may be initially condensed under acid, alkaline or neutral conditions.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

*Example 1*

| | Parts |
|---|---|
| Diamino s-triazinyl carboxy-methyl sulphide | 20.0 |
| Aqueous formaldehyde (approx. 37.1% HCHO) | 81.0 |

The above ingredients were placed in a flask and shaken continuously for 5 hours at room temperature. A sample of the resulting resinous solution, together with the undissolved matter present therein, was placed on a 140° C. hotplate. The resin bodied quickly on the hotplate to an infusible state. It possessed excellent cohesive characteristics and could be removed from the hotplate in sheet form.

*Example 2*

| | Parts |
|---|---|
| Diamino s-triazinyl carboxy-methyl sulphide | 20.0 |
| Aqueous formaldehyde (approx. 37.1% HCHO) | 64.8 | were heated together under reflux at the boiling temperature of the mass for 5 minutes. The reaction mixture was cooled and filtered. The residue was washed and dried at room temperature. The resinous condensation product of diamino s-triazinyl carboxy-methyl sulphide and formaldehyde produced in this manner was found to be suitable for use as a curing agent for acid-curing thermosetting resins, as shown by the following examples:

*Example 3*

| | Parts |
|---|---|
| Urea | 30.0 |
| Aqueous formaldehyde (approx. 37.1% HCHO) | 64.8 |
| Aqueous ammonia (approx. 28% NH$_3$) | 3.0 |
| Aqueous solution of sodium hydroxide (0.5 N) | 2.0 |
| Curing agent from Example 2 | 4.0 | were heated together under reflux at the boiling temperature of the mass for 15 minutes. The resulting resinous condensation product was mixed with 34 parts alpha cellulose in flock form and 0.2 part of a mold lubricant, specifically zinc stearate, to form a molding (moldable) composition. The resulting wet molding compound was dried at 70° C. until sufficient moisture had been removed to provide a material that could be molded satisfactorily. A sample of the dried and ground molding composition was molded for 5 minutes at 140° C. under a pressure of 6,750 pounds per square inch. A well-cured molded article having a well-knit and homogeneous structure was obtained. The molding compound showed good plastic flow during molding.

*Example 4*

| | Parts |
|---|---|
| Melamine | 37.8 |
| Aqueous formaldehyde (approx. 37.1% HCHO) | 72.9 |
| Aqueous ammonia (approx. 28% NH$_3$) | 1.7 |
| Aqueous solution of sodium hydroxide (0.5 N) | 2.0 |
| Curing agent from Example 2 | 4.0 | were heated together under reflux at the boiling temperature of the mass for 12 minutes. A molding compound was made from the resulting resinous syrup by mixing therewith 39 parts alpha cellulose and 0.2 part zinc stearate. The wet compound was dried as described under Example 3. A sample of the dried and ground molding composition was molded for 5 minutes at 140° C. under a pressure of 5,600 pounds per square inch. The molded piece was removed hot from the mold and did not warp or become distorted upon cooling to room temperature. The molded article was well cured and had a well-knit and homogeneous structure. The molding compound showed good plastic flow during molding as evidenced by the amount of flash on the molded piece.

*Example 5*

| | Parts |
|---|---|
| Thiourea | 38.0 |
| Aqueous formaldehyde (approx. 37.1% HCHO) | 81.0 |
| Aqueous ammonia (approx. 28% NH$_3$) | 3.5 |
| Aqueous solution of sodium hydroxide (0.5 N) | 2.5 |
| Curing agent from Example 2 | 5.0 |

The above components were mixed and heated together under reflux at boiling temperature for 30 minutes. The resinous syrup produced in this manner was mixed with 43 parts alpha cellulose and 0.2 part zinc stearate. The resulting wet molding compound was dried at room temperature. A sample of the dried and ground compound was molded as described under Example 4, yielding a well-cured and well-knit, homogeneous molded piece. The molding compound showed excellent flow characteristics during molding.

The following examples illustrate the use of a triazinyl carboxy-alkyl sulphide of the kind with which this invention is concerned as a reactant in the preparation of rapidly curing thermosetting resins:

*Example 6*

A syrupy phenolic resin was prepared from the following components:

| | Parts |
|---|---|
| Phenol (95% phenol, 5% water) | 94.7 |
| Aqueous formaldehyde (approx. 37.1% HCHO) | 195.0 |
| Sodium carbonate | 2.19 |

The above ingredients were heated with constant stirring at an average temperature of 65° C. over a period of 4½ hours. The highest temperature reached during the reaction period was 95° C. and the lowest was 50° C. The clear resinous syrup is referred to in the following formula as "syrupy phenolic resin":

| | Parts |
|---|---|
| Syrupy phenolic resin | 250.0 |
| Diamino s-triazinyl carboxy-methyl sulphide | 14.3 |
| Glycerine | 5.0 |

These ingredients were mixed together and the resulting mixture then was dehydrated under a reduced pressure of approximately 30 mm. mercury. During the dehydration period the resin temperature was raised slowly to 110–115° C. over a period of approximately 45–60 minutes. When all the water had been removed in this manner, the molasses-like casting resin thereby obtained was poured into a container. The resin was heated in this container for about 16 hours at 83° C. The resin cured to an insoluble and infusible state. It was transparent, clear, hard and light in color.

*Example 7*

| | Parts |
|---|---|
| Syrupy phenolic resin such as described under Example 6 | 125.0 |
| Diamino s-triazinyl carboxy-methyl sulphide | 6.3 | were heated together under reflux at the boiling temperature of the mass for 15 minutes, yielding a clear solution that showed some evidence of clouding around the edges of the reaction vessel. The resinous condensation product thereby obtained was mixed with 44 parts alpha cellulose in flock form and 0.2 part zinc stearate. The wet molding compound was air-dried and then was ground. A sample of the dried and ground compound was molded for 15 minutes at 140° C. under a pressure of 6,750 pounds per square inch. A well-cured, well-knit and homogeneous molded piece was obtained. The molded article showed excellent water resistance when immersed in boiling water for 15 minutes. The molding compound showed very good plastic flow during molding.

Examples 6 and 7 illustrate the fact that the triazinyl carboxy-alkyl sulphides herein described are eminently satisfactory for use in curing acid-curing thermosetting resins of the phenoplast type.

Example 8

| | Parts |
|---|---|
| Urea | 30.0 |
| Aqueous formaldehyde (approx. 37.1% HCHO) | 64.8 |
| Diamino s-triazinyl carboxy-methyl sulphide | 0.4 |
| Aqueous ammonia (approx. 28% NH₃) | 3.0 |
| Aqueous solution of sodium hydroxide (0.46 N) | 2.3 | were heated together under reflux at the boiling temperature of the mass for 18 minutes. The resulting resinous syrup was mixed with 33.5 parts alpha cellulose and 0.2 part zinc stearate to form a molding compound. The wet molding composition was dried at room temperature. A well-molded piece was produced by molding a sample of the dried and ground molding compound for 5 minutes at 135° C. under a pressure of 3,500 pounds per square inch.

Example 9

| | Parts |
|---|---|
| Urea | 30.0 |
| Aqueous formaldehyde (approx. 37.1% HCHO) | 64.8 |
| Diamino s-triazinyl carboxy-methyl sulphide | 1.0 |
| Aqueous ammonia (approx. 28% NH₃) | 4.0 |
| Aqueous solution of sodium hydroxide (0.46 N) | 1.5 |

All of the above ingredients with the exception of the diamino s-triazinyl carboxy-methyl sulphide were heated together under reflux at the boiling temperature of the mass for 15 minutes. The triazine derivative was now added and refluxing was continued for an additional 10 minutes to cause the triazinyl compound to intercondense with the urea-formaldehyde partial condensation product. A molding compound and a molded article were produced as described under Example 8. The molding composition of this example yielded a molded article that was higher in water resistance than the molded piece of Example 8.

Example 10

| | Parts |
|---|---|
| Melamine | 31.5 |
| Aqueous formaldehyde (approx. 37.1% HCHO) | 60.0 |
| Diamino s-triazinyl carboxy-methyl sulphide | 0.4 |
| Aqueous ammonia (approx. 28% NH₃) | 3.2 |
| Aqueous solution of sodium hydroxide (0.46 N) | 2.3 |

All of the above ingredients with the exception of the sulphide were heated together under reflux at boiling temperature for 17 minutes. The sulphide was now added and refluxing was continued for an additional 5 minutes. A molding compound was produced from the resulting resinous syrup by mixing therewith 32.5 parts alpha cellulose and 0.2 part zinc stearate. The wet molding compound was dried at room temperature. A sample of the dried and ground molding composition was molded for 5 minutes at 135° C. under a pressure of 3,500 pounds per square inch. A well-cured molded piece having excellent resistance to water was obtained.

Example 11

| | Parts |
|---|---|
| Thiourea | 38.0 |
| Aqueous formaldehyde (approx. 37.1% HCHO) | 64.8 |
| Diamino s-triazinyl carboxy-methol sulphide | 0.4 |
| Aqueous ammonia (approx. 28% NH₃) | 3.8 |
| Aqueous solution of sodium hydroxide (0.46 N) | 2.3 |

All of the above ingredients with the exception of the diamino s-triazinyl carboxy-methyl sulphide were heated together under reflux at boiling temperature for 15 minutes. The sulphide was now added and refluxing was continued for an additional 11 minutes. The resulting resinous syrup was mixed with 36.4 parts alpha cellulose and 0.2 part zinc stearate. The wet molding compound produced in this manner was dried at room temperature. A well-molded article was produced by molding a sample of the dried and ground molding compound for 5 minutes at 135° C. under a pressure of 3,500 pounds per square inch.

Example 12

| | Parts |
|---|---|
| Thiourea | 38.0 |
| Aqueous formaldehyde (approx. 37.1% HCHO) | 90.0 |
| Diamino s-triazinyl carboxy-methyl sulphide | 1.5 |
| Aqueous ammonia (approx. 28% NH₃) | 5.0 |
| Aqueous solution of sodium hydroxide (0.46 N) | 1.3 |

All of the above components with the exception of the sulphide were heated together under reflux at boiling temperature for 10 minutes. The sulphide was now added and refluxing was continued for an additional 20 minutes. The resulting resinous syrup was mixed with 45.3 parts alpha cellulose and 0.2 part zinc stearate to form a molding compound. The wet molding composition was dried at 70° C. A sample of the dried and ground molding composition was molded as described under Example 11. The molded piece was well cured and had very good resistance to water, as shown by the fact that it absorbed only 2.8% by weight of water when immersed in boiling water for 15 minutes followed by immersion in cold water for 5 minutes.

It will be understood, of course, by those skilled in the art that our invention is not limited to condensation products obtained by reaction of ingredients comprising an aldehyde and the specific diamino s-triazinyl carboxy-alkyl sulphide named in the above illustrative examples. Thus, instead of diamino s-triazinyl carboxy-methyl sulphide, we may use diamino s-triazinyl alpha-(carboxy-ethyl) sulphide or any other organic sulphide (or mixture thereof) of the kind with which this invention is concerned, numerous examples of which compounds have been given hereinbefore and in our copending application Serial No. 421,682.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular properties desired in the final product. Thus, we may use, for example, from 0.5 to 6 or 7 mols of an aldehyde for each mol of triazine derivative. The lower amounts are preferred when the reaction product of the aldehyde and triazine derivative are to be used as agents for accelerating the conversion of acid-curing thermosetting resins to an insoluble, infusible state. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, from 1 to 12 or 15 or more mols of such alkylol derivatives for each mol of the triazine derivative.

When the diamino triazinyl carboxy-alkyl sulphide is used primarily as an intercondensable curing reactant for accelerating the conversion of acid-curing thermosetting resins to an insoluble, infusible state, only a relatively small amount of such sulphide ordinarily is required, for example an amount corresponding to from 0.4 or 0.5% to 5 or 6% by weight of the resin to be cured, calculated on the basis of the dry resin. In some cases it may be desirable to use higher amounts, for instance up to 10 or 15 or more parts by weight of the sulphide per 100 parts (net dry) of the acid-curing thermosetting resin. When the sulphide is incorporated into the acid-curing thermosetting resin in the form of a soluble, fusible aldehyde-reaction product thereof, then higher amounts of such reaction product ordinarily are used as compared with the amount employed when using the sulphide itself. The sulphide or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the diamino triazinyl carboxy-alkyl sulphide herein described or by their soluble, fusible aldehyde-reaction products, are the acid-curing phenol-aldehyde resins, aminotriazole-aldehyde resins, melamine-formaldehyde resins, urea-aldehyde resins, urea-aminotriazine-aldehyde resins, aminodiazine-aldehyde resins, protein-aldehyde resins (e. g., casein-formaldehyde resins), resinous condensation products of aldehyde such as formaldehyde with polyamides as, for instance, malonic diamide, maleic diamide, fumaric diamide, itaconic diamide, etc. Other examples of amino or amido compounds that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanyl urea, biguanide, aminoguanidine, melamine, triureido melamine, ammeline, ammelide, melem, melam, melon, aminotriazoles, aminodiazines, etc. Suitable mixtures of such compounds also may be used.

Phenol itself and various substituted phenols, for example the cresols, the xylenols, etc., may be condensed with aldehydes, e. g., formaldehyde, furfural, etc., to form acid-curing thermosetting resins of the phenoplast type, and these thermosetting resins then can be cured to the insoluble and infusible state with the aid of the herein-described triazinyl carboxy-alkyl sulphides or with the soluble, fusible aldehyde-reaction products of such sulphides. The curing agents of this invention, when incorporated into acid-curing phenoplasts, also impart improved color and light stability to the cured product. This was quite unexpected, since in no way could it have been predicted that the introduction of a triazine derivative containing an —NHR radical and, also, a —COOH radical into an acid-curing phenoplast would improve the color of the end-product and, in addition, facilitate the conversion of the potentially reactive resin to a cured (insoluble and infusible) state. Another advantage accruing from our invention resides in the simplicity with which casting resins, particularly phenol-aldehyde casting resins adapted to be hardened under heat (e. g., at temperatures of the order of about 60° to 130° C.), can be produced.

If desired, the fundamental resins of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53–75, page 4, column 1, lines 1–40, which patent is assigned to the same assignee as the present invention.

Thermosetting molding compositions comprising a filler and an acid-curing thermosetting resin carrying a curing agent comprising a diamino triazinyl carboxy-alkyl sulphide of the kind herein described, or a soluble, fusible aldehyde-reaction product of such a sulphide, may be molded into a variety of shapes under heat and pressure, more particularly at temperatures of the order of 100° to 200° C., preferably from approximately 120° to 180° C. The molding compositions show good plastic flow during molding, since the curing agent not only functions as such but also generally serves to impart improved plastic flow to the molding composition. Molded articles of manufacture comprising the molded, heat-hardened molding compositions of this invention have a good surface finish, show no evidence of "bleeding" the curing agent, are well cured throughout, and show no loss in any of their other useful properties due to the presence of the triazinyl carboxy-alkyl sulphide or aldehyde-reaction product thereof.

What we claim as new and desire to secure by Letters Patent of the United States is:

1. A composition comprising an acid-curing, thermosetting resin carrying a curing agent therefor comprising a compound selected from the class consisting of (1) compounds represented by the general formula

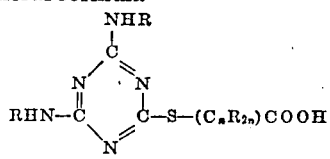

where $n$ represents an integer and is at least 1 and not more than 2, and R represents a member of the class consisting of hydrogen and monovalent hydrocarbon and halo-hydrocarbon radicals; and (2) soluble, fusible aldehyde-reaction products of the compounds of (1).

2. A composition comprising an acid-curing, thermosetting, phenol-aldehyde resin having incorporated therein a compound represented by the general formula

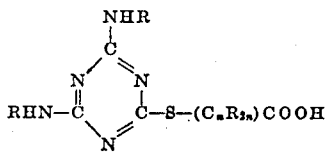

where $n$ represents an integer and is at least 1 and not more than 2, and R represents a member of the class consisting of hydrogen and monovalent hydrocarbon and halo-hydrocarbon radicals.

3. A composition comprising an acid-curing, thermosetting, amidogen-aldehyde resin having incorporated therein a compound represented by the general formula

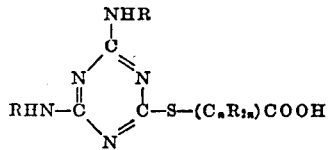

where $n$ represents an integer and is at least 1 and not more than 2, and R represents a member of the class consisting of hydrogen and monovalent hydrocarbon and halo-hydrocarbon radicals.

4. A composition of matter comprising the product of reaction of ingredients comprising an aldehyde and a compound represented by the general formula

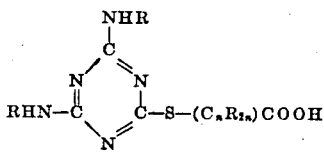

where $n$ represents an integer and is at least 1 and not more than 2, and R represents a member of the class consisting of hydrogen and monovalent hydrocarbon and halo-hydrocarbon radicals.

5. A composition as in claim 4 wherein the aldehyde is formaldehyde.

6. A composition comprising the product of reaction of ingredients comprising an aldehyde and a compound represented by the general formula

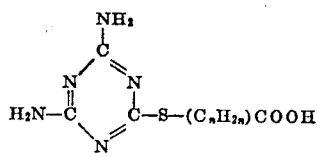

where $n$ is an integer and is at least 1 and not more than 2.

7. A composition comprising the condensation product of ingredients comprising formaldehyde and diamino s-triazinyl carboxy-methyl sulphide.

8. A composition comprising the product of reaction of ingredients comprising a phenol, an aldehyde and a compound represented by the general formula

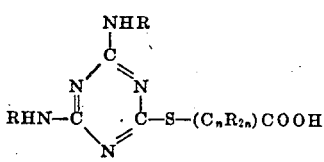

where $n$ represents an integer and is at least 1 and not more than 2, and R represents a member of the class consisting of hydrogen and monovalent hydrocarbon and halo-hydrocarbon radicals.

9. A composition comprising the product of reaction of ingredients comprising a urea, an aldehyde and a compound represented by the general formula

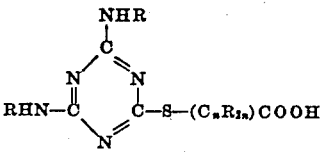

where $n$ represents an integer and is at least 1 and not more than 2, and R represents a member of the class consisting of hydrogen and monovalent hydrocarbon and halo-hydrocarbon radicals.

10. A heat-curable resinous condensation product of ingredients comprising urea, formaldehyde and a compound represented by the general formula

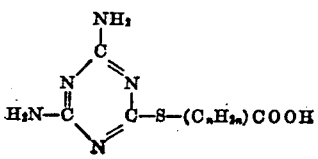

where $n$ is an integer and is at least 1 and not more than 2.

11. A product comprising the cured resinous condensation product of claim 10.

12. A composition comprising the resinous product of reaction of ingredients comprising melamine, formaldehyde and a compound represented by the general formula

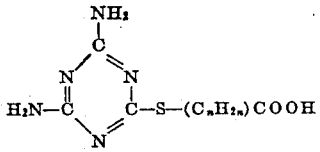

where $n$ is an integer and is at least 1 and not more than 2.

13. A composition comprising the resinous product of reaction of (1) a partial condensation product of ingredients comprising a phenol and an aldehyde, and (2) a compound represented by the general formula

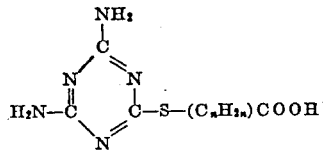

where $n$ is an integer and is at least 1 and not more than 2.

14. A composition comprising the resinous product of reaction of (1) a partial condensation product of ingredients comprising a urea and an aldehyde, and (2) a compound represented by the general formula

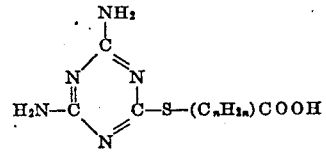

where $n$ is an integer and is at least 1 and not more than 2.

15. A resinous composition comprising the product of reaction of (1) a partial condensation product obtained by reaction, while admixed with an alkaline substance, of ingredients comprising urea and formaldehyde, and (2) diamino s-triazinyl carboxy-methyl sulphide.

16. A resinous composition comprising the product of reaction of (1) a partial condensation product obtained by reaction, while admixed with an alkaline substance, of ingredients comprising melamine and formaldehyde, and (2) diamino s-triazinyl carboxy-methyl sulphide.

17. A composition comprising the resinous product of reaction of ingredients comprising urea, formaldehyde and diamino s-triazinyl carboxy-methyl sulphide.

18. A thermosetting molding composition comprising a filler and an acid-curing partial condensation product of ingredients comprising urea and formaldehyde, said condensation product having incorporated therein a small amount of a curing agent comprising diamino s-triazinyl carboxy-methyl sulphide.

19. The method of preparing new condensation products which comprises effecting reaction between ingredients comprising an aldehyde and a compound represented by the general formula.

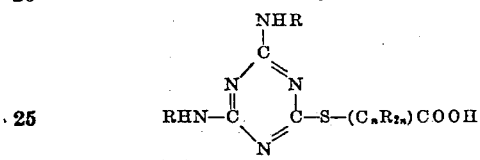

where $n$ represents an integer and is at least 1 and not more than 2, and R represents a member of the class consisting of hydrogen and monovalent hydrocarbon and halo-hydrocarbon radicals.

20. The method which comprises effecting partial reaction between ingredients comprising urea and formaldehyde under alkaline conditions, adding to the resulting partial condensation product a small amount of a compound represented by the general formula

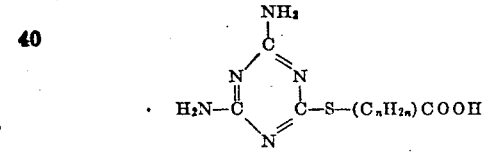

where $n$ represents an integer and is at least 1 and not more than 2, and causing the said compound to intercondense with the said partial condensation product.

GAETANO F. D'ALELIO.
JAMES W. UNDERWOOD.

CERTIFICATE OF CORRECTION.

Patent No. 2,338,492. January 4, 1944.

GAETANO F. D'ALELIO, ET AL.

It is hereby certified that error appears in the printed specification of the above numbered patent requiring correction as follows: Page 1, second column, line 1, for "ethyl, chlorophenyl, phenyl," read --ethyl chlorophenyl, phenyl--; page 4, second column, line 21, for "carboxy-methol" read --carboxy-methyl--; page 5, second column, line 17, for "sulphide" read --sulphides--; line 25, for "aldehyde" read --aldehydes--; line 54, for "curved" read --cured--; page 7, second column, line 20, after "formula" strike out the period; and that the said Letters Patent should be read with this correction therein that the same may conform to the record of the case in the Patent Office.

Signed and sealed this 25th day of April, A. D. 1944.

(Seal)

Leslie Frazer

Acting Commissioner of Patents.